(12) United States Patent
Kim et al.

(10) Patent No.: US 12,154,248 B2
(45) Date of Patent: Nov. 26, 2024

(54) METHOD AND DEVICE FOR OUTPUTTING AN IMAGE

(71) Applicant: 3i Inc., Daegu (KR)

(72) Inventors: Ken Kim, Seoul (KR); Ji Wuck Jung, Gyeonggi-do (KR); Kevin Nathanael Santoso, Seoul (KR)

(73) Assignee: 3i Inc., Daegu (KR)

( * ) Notice: Subject to any disclaimer, the term of this patent is extended or adjusted under 35 U.S.C. 154(b) by 62 days.

(21) Appl. No.: 17/869,789

(22) Filed: Jul. 21, 2022

(65) Prior Publication Data

US 2023/0140932 A1    May 11, 2023

(30) Foreign Application Priority Data

Nov. 8, 2021 (KR) .................... 10-2021-0152411

(51) Int. Cl.
*G06T 3/40* (2024.01)
*G06T 15/20* (2011.01)

(52) U.S. Cl.
CPC ............... *G06T 3/40* (2013.01); *G06T 15/20* (2013.01); *G06T 2200/04* (2013.01)

(58) Field of Classification Search
CPC ........ G06T 3/40; G06T 15/20; G06T 2200/04
See application file for complete search history.

(56) References Cited

U.S. PATENT DOCUMENTS

| 2015/0070357 A1* | 3/2015 | Tahan ............... G06F 3/14 345/428 |
| 2017/0372509 A1* | 12/2017 | Paltashev ............. G06T 15/405 |
| 2019/0356894 A1* | 11/2019 | Oh ................. H04N 21/234345 |

FOREIGN PATENT DOCUMENTS

| JP | 2011090633 | 5/2011 |
| KR | 102046910 | 11/2019 |
| KR | 20200124906 | 11/2020 |
| KR | 20200131817 | 11/2020 |

\* cited by examiner

*Primary Examiner* — Xin Sheng
(74) *Attorney, Agent, or Firm* — JCIPRNET

(57) ABSTRACT

In order to output an image to a user, an electronic device may include loading a plurality of basic image tiles with a first resolution, the plurality of basic image tiles being preset for a graphic space set based on a virtual coordinate system, determining a target basic-image tile among the plurality of basic image tiles based on a coordinate of a virtual camera set on the virtual coordinate system, transmitting information on a target basic-image tile to a server, receiving a plurality of detailed image tiles with a second resolution corresponding to the target basic-image tile from the server, and outputting an image with the second resolution based on the plurality of detailed image tiles when the virtual camera zooms in on the target basic-image tile.

8 Claims, 9 Drawing Sheets

METHOD AND DEVICE FOR OUTPUTTING AN IMAGE

CROSS-REFERENCE TO RELATED APPLICATIONS

This application claims the benefit under 35 USC § 119(a) of Korean Patent Application No. 10-2021-0152411, filed on Nov. 8, 2021, at the Korean Intellectual Property Office, the entire disclosure of which is incorporated herein by reference for all purposes.

BACKGROUND

1. Field of the Invention

The present disclosure relates to a technology for providing an image to a user, and, more particularly, to a device and a method for outputting an image on the basis of a viewpoint of a virtual camera with respect to a graphic space.

This application is research (No. 2020-0-00994, development of technology for generating autonomous Virtual Reality (VR). and Augmented Reality (AR) content reflecting the use environment) conducted in 2021 by the Institute of Information & Communications Technology Planning & Evaluation with funding from the Ministry of Science and ICT.

2. Description of the Related Art

The texture representation may be different according to image resolutions in a virtual environment. It is desirable to provide a high resolution image to a user. However, if the high resolution image is provided in all the directions of the virtual environment, the user may not immediately receive the high resolution image as it takes longer to transmit due to the large amount of the data to be received from a server connected to the user terminal. However, if a low resolution image is provided to the user, the user will not experience a vivid image.

SUMMARY

Example embodiments may provide a method and a device for quickly providing a high resolution image to a user.

According to an aspect, an image output method performed by an electronic device may include loading a plurality of basic image tiles with a first resolution being preset for a graphic space set based on a virtual coordinate system, setting a coordinate of a virtual camera on a virtual coordinate system, determining at least one target basic-image tile of the plurality of basic image tiles based on the coordinate of the virtual camera, transmitting information on the target basic-image tile to a server, receiving a plurality of detailed image tiles with a second resolution corresponding to the target basic-image tile from the server, and outputting an image of the second resolution based on the plurality of detailed image tiles when the virtual camera zooms in on the target basic-image tile.

The determining of the at least one target basic-image tile among the plurality of basic image tiles based on the coordinate of the virtual camera may include determining a viewpoint of the virtual camera based on the coordinate of the virtual camera, calculating frustum information on the viewpoint of the virtual camera, and determining at least one target basic-image tile among the plurality of basic image tiles based on the frustum information.

The image output method may further include outputting an image of the first resolution based on the frustum information and the target basic-image tile.

The determining of a viewpoint of the virtual camera based on the coordinate of the virtual camera may include changing the coordinate of the virtual camera based on a user's input of the electronic device and determining a viewpoint of the virtual camera based on the changed coordinate of the virtual camera.

When the virtual camera zooms in on the target basic-image tile, the image output method may further include determining at least one target detailed-image tile among the plurality of detailed image tiles, transmitting information on the target detailed-image tile to the server, and receiving a plurality of additional-detailed image tiles with a third resolution corresponding to the target detailed-image tile from the server.

When the virtual camera zooms in on the target detailed-image tile, the image output method may further include outputting an image of the third resolution based on the plurality of additional-detailed image tiles.

When the coordinate or viewpoint of the virtual camera is changed, the determining of the at least one target basic-image tile among the plurality of basic image tiles based on the coordinate of the virtual camera may include re-determining at least one target basic-image tile among the plurality of basic image tiles based on the changed coordinate or viewpoint of the virtual camera.

The transmitting of the information on the target basic-image tile to the server may include determining whether the plurality of detailed image tiles with the second resolution corresponding to the target basic-image tile is stored and transmitting, to the server, information on the target basic-image tile when the plurality of detailed image tiles with the second resolution is not stored.

According to an example embodiment, an electronic device for performing the image output method may include a memory in which an image output program is recorded, and a processor for performing the program wherein the program may include loading a plurality of basic image tiles with a first resolution being preset for a graphic space set based on a virtual coordinate system, setting a coordinate of the virtual camera on the virtual coordinate system, determining at least one target basic-image tile among the plurality of basic image tiles based on the coordinate of the virtual camera, transmitting information on the target basic-image tile to a server, receiving a plurality of detailed image tiles with a second resolution corresponding to the target basic-image tile from the server, and outputting an image with the second resolution based on the plurality of detailed image tiles when the virtual camera zooms in on the target basic-image tile.

According to an embodiment of the present disclosure, the image output method performed by a system outputting an image to a user may include: loading, by a user's terminal of the system, a plurality of basic image tiles with a first resolution being preset for a graphic space set based on a virtual coordinate system; setting, by the user's terminal, a coordinate of a virtual camera on the virtual coordinate system; determining, by the user's terminal, at least one target basic-image tile among the plurality of basic image tiles based on the coordinate of the virtual camera; transmitting, by the user's terminal, information on the target basic-image tile to the system server; receiving, by the user's terminal, a plurality of detailed image tiles with a second resolution corresponding to the target basic-image tile from the server; and outputting an image with the second resolution based on the plurality of detailed image tiles when the virtual camera zooms in on the target basic-image tile.

Additional aspects of example embodiments will be set forth in part in the description which follows, and, in part, will be apparent from the description, or may be learned by practice of the disclosure.

According to example embodiments, the present disclosure provides a method and a device quickly delivering a high resolution image to a user.

DETAILED DESCRIPTION

Figure 1:
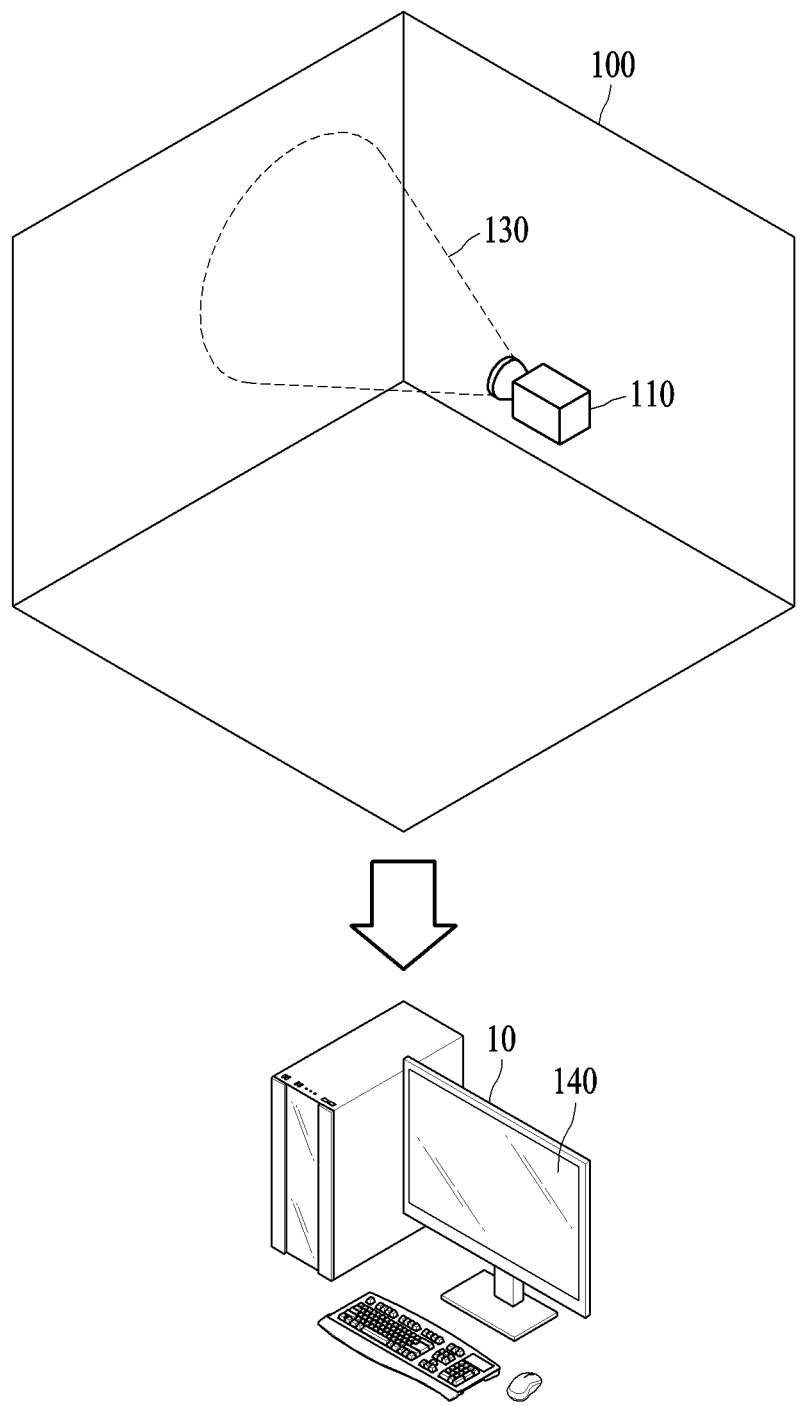
FIG. 1 illustrates a method of providing an image to a user based on a graphic space according to an example embodiment.

Hereinafter, example embodiments of the present disclosure are to be described in detail with reference to accompanying diagrams. However, the scope of the patent application is not limited or restricted to these embodiments. The same reference numerals in the diagrams denote the same elements.

Various changes may be made to the embodiments described herein. It should be noted that embodiments of the present disclosure are not limited to the embodiments described herein but include all modifications, equivalents, and alternatives thereto.

The terms used in the embodiments of the present disclosure are only used to describe a particular embodiment, but not to limit the embodiments. Singular representation includes a plurality of the representation unless the context clearly indicates otherwise. It should be understood that the terms "include", "have", or the like herein specify the existence of features, numbers, steps, operations, components, parts, or combinations thereof but do not preclude possible presence or addition of one or more features, numbers, steps, operations, components, components, or combinations thereof.

Unless defined otherwise, all terms used herein including technical or scientific terms have the same meaning as commonly understood by a person of ordinary skill in the art to which the embodiments belong. Terms such as those defined in a dictionary commonly used should be interpreted as having a meaning that is consistent with the meaning of the relevant art. Unless explicitly defined in the present disclosure, terms should not be interpreted as an ideal or overly formal sense.

In addition, as described with reference to the accompanying diagrams, the same component in the drawings is denoted by the same reference numeral, and thus duplicate descriptions thereof are omitted. In describing an embodiment of the present disclosure, a detailed description of relevant known technology is omitted when it may obscure the subject matter of the embodiment.

FIG. 1 illustrates a method of providing an image to a user based on a graphical space according to an example embodiment.

An example embodiment may represent disposing a virtual camera 110 corresponding to a user's viewpoint in a pre-generated graphic space 100 (or a virtual space) for various purposes, and providing the user with an image 140 of a scene in the graphic space according to a viewpoint 130 of the virtual camera 110. The user may enter the graphic space 100 through an electronic device 10. For example, the user may receive the pre-generated graphic space 100 through a service for various purposes such as games or travel.

According to an example embodiment, the service may be provided to the user through a server (not shown) connected online to the electronic device 10. The graphic space 100 may be generated by a preset virtual coordinate system.

For example, the virtual coordinate system may be a three-dimensional coordinate system represented by x, y and z axes, and the graphic space 100 may be generated in a form of a hexahedron (e.g., a cube) based on the three-dimensional coordinate system. The server may generate the graphic space 100 based on pre-generated (or captured) one or more images. For example, one or more images previously generated may be a panoramic image capturing a scene of a reality. The panoramic image may be divided into six portions and the graphic space 100 may be generated based on the divided portions. The panoramic image may be a high quality image.

As another example, the virtual coordinate system may be represented by the spherical coordinate system, and the graphics space 100 may be generated in a form of a sphere based on the spherical coordinate system. The virtual coordinate system and the graphic space 100 are not limited to the embodiments described herein.

In order to implement the graphic space 100 as a high quality image in the electronic device 10, the electronic device 10 may receive partial images constituting the graphic space 100 from a server and reconstruct the graphic space 100 based on the partial images. The electronic device 10 may set the virtual camera 110 in the graphic space 100 reconstructed in the electronic device 10, and, based thereon, provide the user with the image 140 for the graphical space 100.

In order for the electronic device 10 to reconstruct the graphic space 100, the electronic device 10 should receive partial images constituting the graphic space 100 from the server. However, when the electronic device 10 receives a high quality image, the amount of data received by the electronic device 10 is large, which may cause a delay of image output.

Referring to FIGS. 2 through 9, a method of outputting an image in the graphic space 100 without delay is described in detail.

Figure 2:
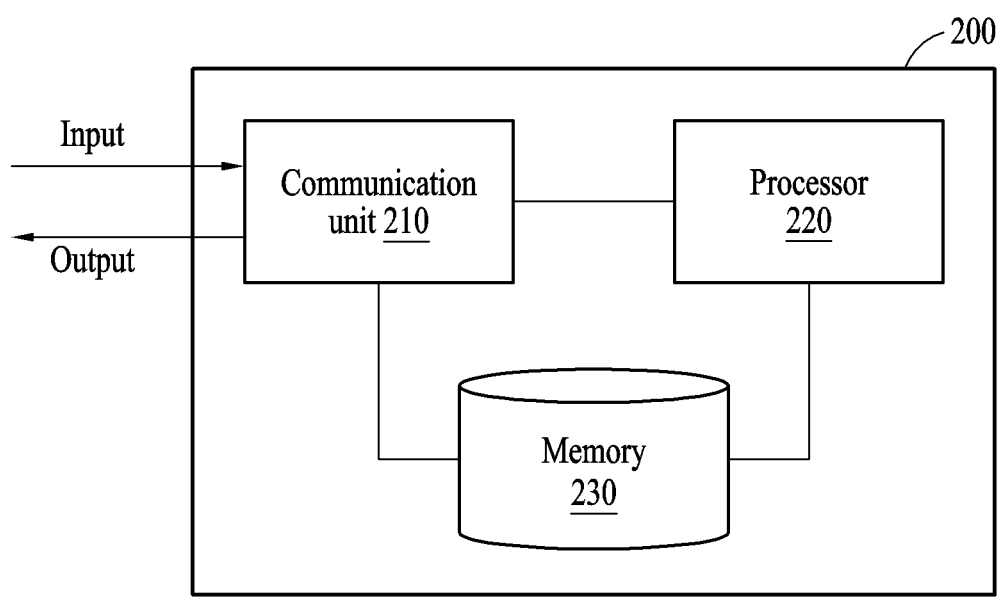
FIG. 2 is a block diagram of an electronic device according to an example embodiment of the present disclosure.

FIG. 2 is a block diagram of an electronic device according to an example embodiment of the present disclosure.

An electronic device 200 may include a communication unit 210, a processor 220, and a memory 230. For instance, the electronic device 200 may be the electronic device 10 described herein with reference to FIG. 1. The electronic device 10 may be a personal computer (PC), a mobile device, or a smart phone, but is not limited to the embodiments described herein.

The communication unit 210 is connected to the processor 220 and the memory 230 to transmit and receive data. The communication unit 210 may be connected to an external device to transmit and receive data. Hereinafter, the expression "transmit and receive A" may indicate transmitting and receiving information or data representing "A".

The communication unit 210 may be embodied as circuitry in the electronic device 200. For example, the communication unit 210 may include an internal bus and an external bus. As another example, the communication unit 210 may be a component connecting the electronic device 200 and an external device. The communication unit 210 may be an interface. The communication unit 210 may receive data from an external device and transmit data to the processor 220 and the memory 230.

The processor 220 processes data received by the communication unit 210 and data stored in the memory 230. The "processor" may be an data processing device embodied as a hardware with circuitry of a physical structure for performing desired operations. For example, the desired operations may include code or instructions included in a program. For example, the data processing device embodied as a hardware may include a microprocessor, a central processing unit, a processor core, a multi-core processor, a multi-processor, an Application-Specific Integrated Circuit (ASIC), and a Field Programmable Gate Array (FPGA).

The processor 220 performs code that may be readable by a computer stored in a memory (e.g., the memory 230), and instructions induced by the processor 220.

The memory 230 stores the data received by the communication unit 210 and the data processed by the processor 220. For example, the memory 230 may store a program (or an application or software). The stored program may be a set of syntax that may be coded to output an image to a user and be performed by the processor 220.

According to an aspect, the memory 230 may include one or more of volatile memories, non-volatile memories and Random Access Memories (RAM), flash memories, hard disk drives, and optical disk drives.

The memory 230 stores a set of instructions (e.g., software) that operates the electronic device 200. The set of instructions for operating the electronic device 200 is performed by the processor 220.

The communication unit 210, the processor 220, and the memory 230 are described in detail with reference to FIGS. 3 through 9.

Figure 3:
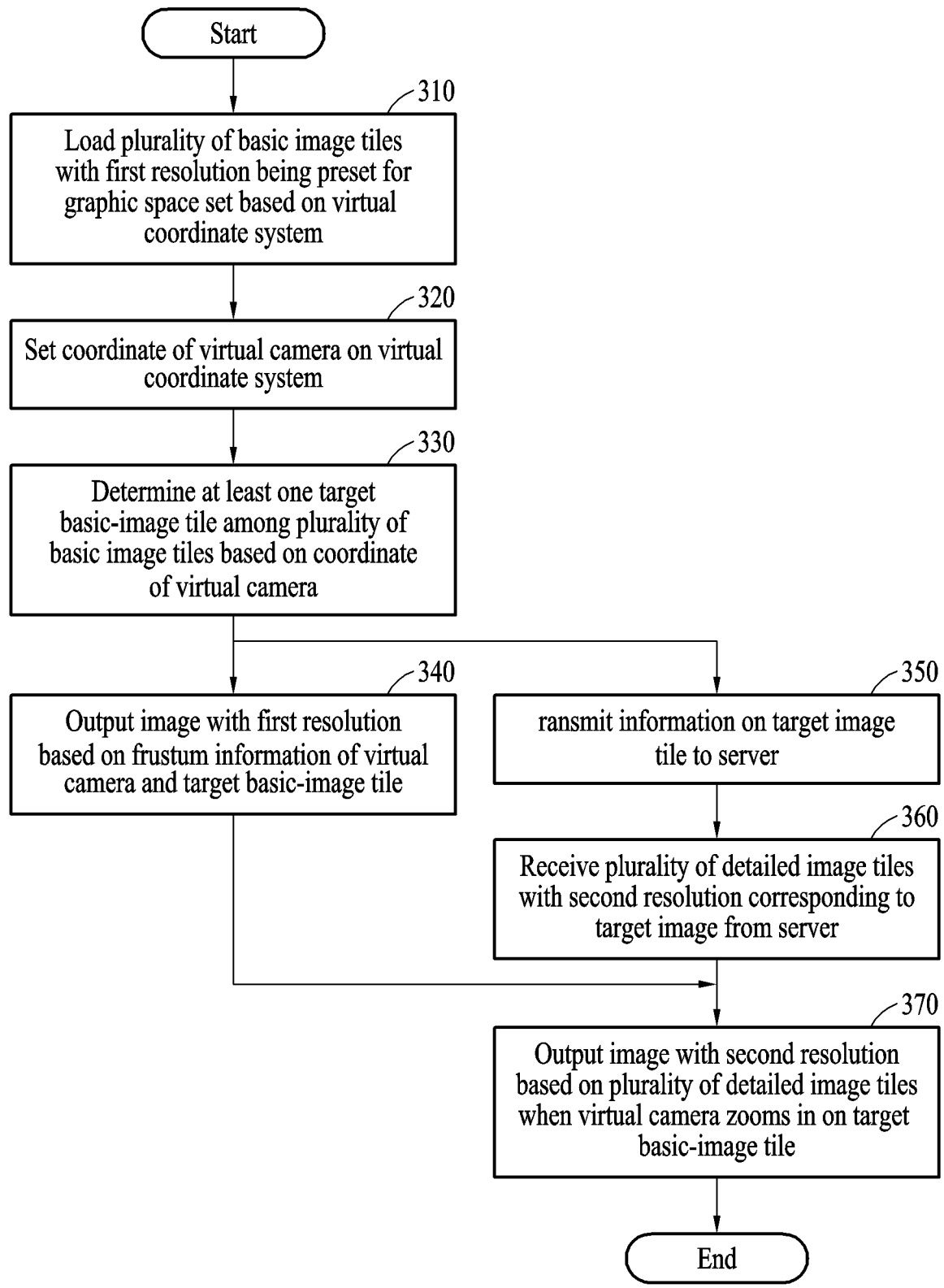
FIG. 3 is a flowchart of an image output method according to an embodiment of the present disclosure.

FIG. 3 is a flowchart of an image output method according to an embodiment of the present disclosure.

According to an embodiment, an image output system may include the electronic device 200 and a server connected to the electronic device 200 described above with reference to FIG. 2.

Operations 310 through 370 below may be performed by the electronic device 200.

In operation 310, the electronic device 200 may load (or receive) a plurality of basic image tiles with a first resolution being preset for a graphic space set based on a virtual coordinate system. A graphic space initially generated by a server may be composed of image tiles with a highest resolution (e.g., a third resolution herein), but the graphic space initially reconstructed by the electronic device 200 may be reconstructed based on the basic image tiles with a low resolution (e.g., a first resolution). The first resolution may be 512 pixels by 512 pixels. The electronic device 200 may reduce delay time to reconstruct the graphic space by receiving the basic image tiles with the low resolution from the server. The plurality of basic image tiles are described in detail hereinafter with reference to FIG. 4.

In operation 320, the electronic device 200 may set a coordinate of a virtual camera on the virtual coordinate system. The virtual camera may correspond to a location of a user's eyes in the graphics space. For example, the coordinate of the virtual camera may be a preset default coordinate. As another example, the coordinate of the virtual camera may be adjusted based on a user's input.

In operation 330, the electronic device 200 may determine at least one target basic-image tile among the plurality of basic image tiles based on the coordinate of the virtual camera. The target basic-image tile may be a basic image tile corresponding to a direction at which a user is looking through the virtual camera. A method of determining the target basic-image tile is described in detail hereinafter with reference to FIGS. 5 through 7.

In operation 340, the electronic device 200 may output an image with the first resolution based on frustum information of the virtual camera and the target basic-image tile. The frustum information of the virtual camera is described in detail with reference to FIG. 6.

According to one aspect, the electronic device 200 may render a scene of the graphic space corresponding to a viewpoint of the virtual camera to generate an image with the first resolution, and output the generated image to the user via a display of the electronic device 200.

In operation 350, the electronic device 200 may send information about the target basic-image tile to the server. Since an image being output is the first resolution, the user is likely to zoom in to view, in detail, the image at which the user is looking (or outputting). When the electronic device 200 transmits information on the target basic-image tile to the server after the user zooms in, a delay may occur until a high resolution image is displayed to the user. To prevent such a delay, the electronic device 200 may transmit information on the target basic-image tile to the server prior to the user zooming in, and receive detailed image tiles with a second resolution corresponding to the target basic-image tile.

In operation 360, the electronic device 200 may receive the plurality of detailed image tiles with the second resolution corresponding to the target basic-image tile from the server. The second resolution may be higher than the first resolution.

In operation 370, when the virtual camera zooms in on the target basic-image tile, the electronic device 200 may output an image with the second resolution based on the plurality of detailed image tiles previously received from the server.

According to one aspect, the electronic device 200 may render a graphic space corresponding to the zoomed-in viewpoint of the virtual camera to generate an image with the second resolution, and output the generated image to the user through a display of the electronic device 200. Since the image with the second resolution is generated and output based on the plurality of detailed image tiles previously received before the virtual camera zooms in, the delay in outputting an image experienced by the user may be significantly reduced.

According to an embodiment, the user may change a coordinate or a viewpoint of the virtual camera while the image with the second resolution is being output (i.e., zooming in). When a basic image tile corresponding to the modified coordinate or viewpoint of the virtual camera is different from the target basic-image tile determined in operation 330, operation 340 may be performed again based on a new target basic-image tile. For example, when the basic image tile being examined changes while the image with second resolution is being output, the image with the first resolution may be output by zooming out. Unlike the embodiment, when the coordinate or viewpoint of the camera partially changes but the basic image tile remains the same, the image with the second resolution may be continuously output. That is, the image with the second resolution being output according to the changed coordinate or viewpoint of the virtual camera may be different from the image before the coordinate or viewpoint of the camera changes, but the resolution may be the same.

Figure 4:
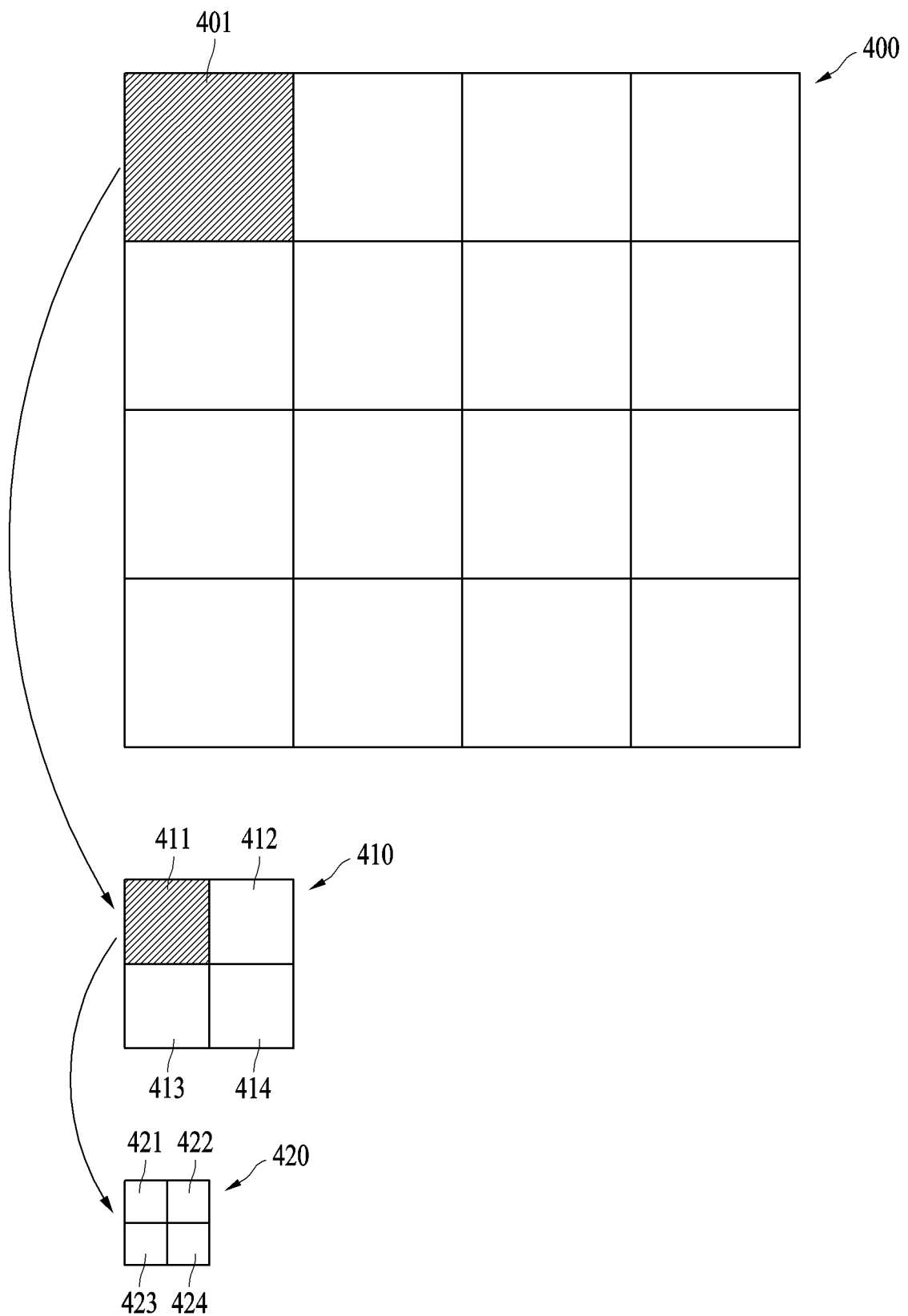
FIG. 4 illustrates basic image tiles, detailed image tiles, and additional-detailed image tiles according to an example embodiment.

FIG. 4 illustrates basic image tiles, detailed image tiles, and additional-detailed image tiles according to an example embodiment.

An embodiment illustrates a plurality of basic image tiles 400 constituting a portion of a graphic space reconstructed by an electronic device 200. For example, when the graphic space is in the form of a cube, the plurality of basic image tiles 400 may constitute any side of the cube.

According to an example embodiment, a plurality of detailed image tiles 410 corresponding to a first basic image tile 401 among the plurality of basic image tiles 400 may be saved in a server. The plurality of detailed image tiles 410 may include a first detailed image tile 411, a second detailed image tile 412, a third detailed image tile 413, and a fourth detailed image tile 414. Each of the plurality of detailed image tiles 410 may have a second resolution.

For example, in operation 330 described herein with reference to FIG. 3, the electronic device 200 may send information about the first basic image tile 401 as a target basic-image tile to the server, and the server may send the plurality of detailed image tiles 410 corresponding to the first basic image tile 401 to the electronic device 200.

Additionally, according to one embodiment, a plurality of additional-detailed image tiles 420 corresponding to the first detailed image tile 411 among the plurality of detailed image tiles 410 may be saved in the server. The plurality of additional-detailed image tiles 420 may include a first additional-detailed image tile 421, a second additional-detailed image tile 422, a third additional-detailed image tiles 423, and a fourth additional-detailed image tiles 424. Each of the plurality of additional-detailed image tiles 410 may have a third resolution. The third resolution may be higher than the second resolution.

An embodiment where the server transmits the plurality of additional-detailed image tiles 420 to the electronic device 200 is described in detail with reference to FIG. 8 herein.

Figure 5:
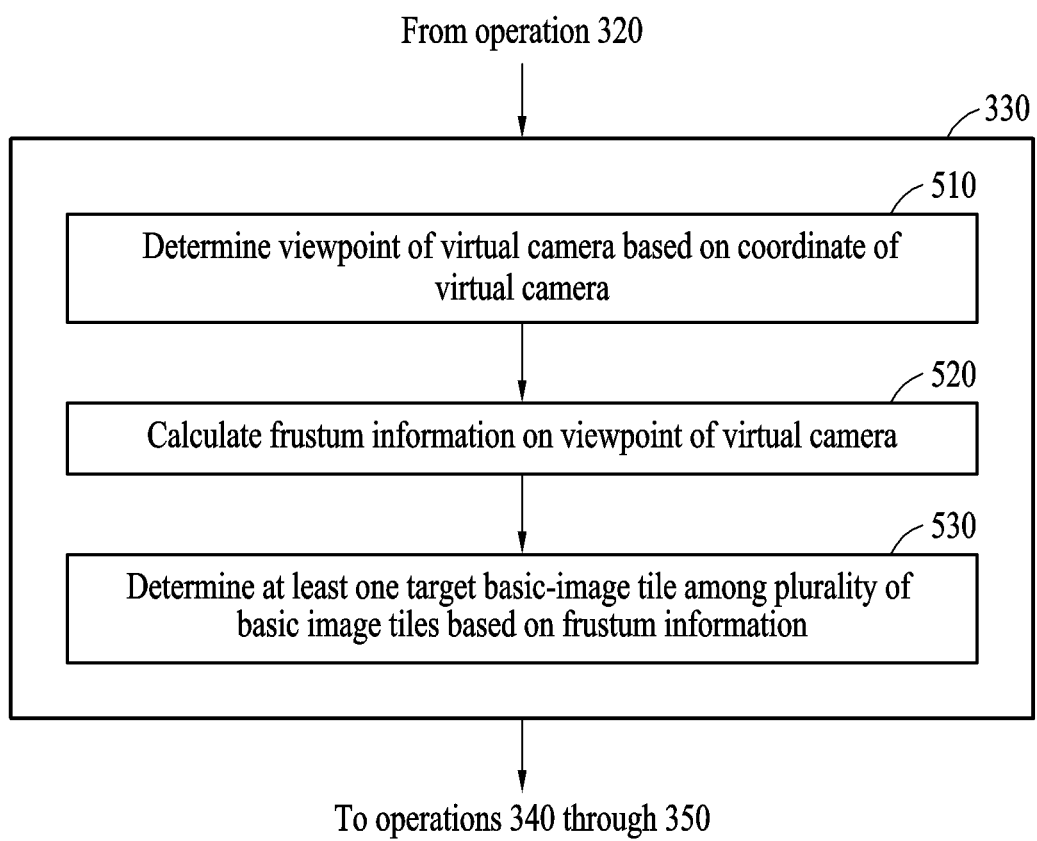
FIG. 5 is a flowchart illustrating a method of determining a target basic-image tile based on a viewpoint of a virtual camera according to an example embodiment.

FIG. 5 is a flowchart of a method of determining a target basic-image tile based on a viewpoint of a virtual camera according to an example embodiment.

According to one embodiment, operation 330 described herein with reference to FIG. 3 may include operations 510 through 530.

In operation 510, the electronic device 200 determines a viewpoint of a virtual camera in a virtual coordinate system of a graphic space based on a coordinate of the virtual camera. The viewpoint of the virtual camera may indicate a direction or an optical axis of the lens of the camera based on the coordinate of the camera.

In operation 520, the electronic device 200 calculates frustum information for the viewpoint of the virtual camera. The frustum is described in detail with reference to FIG. 6.

In operation 530, the electronic device 200 may determine at least one target basic-image tile among a plurality of basic image tiles based on frustum information. For example, a basic image tile corresponding to a scene of the graphic space captured by the virtual camera may be determined as the target basic-image tile.

Figure 6:
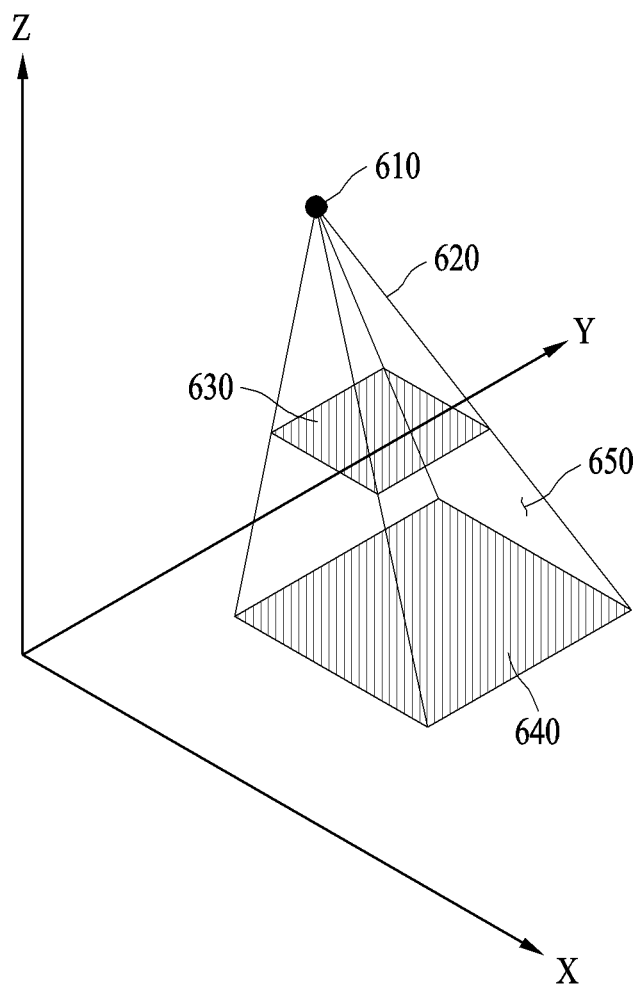
FIG. 6 illustrates frustum information according to a viewpoint of a virtual camera according to an example embodiment.

FIG. 6 illustrates frustum information according to a viewpoint of a virtual camera according to an example embodiment.

A three-dimensional structure of a quadrangular pyramid 620 is defined based on a coordinate of a virtual camera 610 set within a virtual coordinate system of a graphic space. A first plane 630 and a second plane 640 may be set inside the three-dimensional structure of the quadrangular pyramid for an image of the coordinate 610. Based on the first plane 630 and the second plane 640, a frustum 650 is generated.

According to one embodiment, at least one of the first plane 630 and the second plane 640 may be set based on internal parameters such as a focal length of a lens of the virtual camera, which is not limited to the described embodiment.

Figure 7:
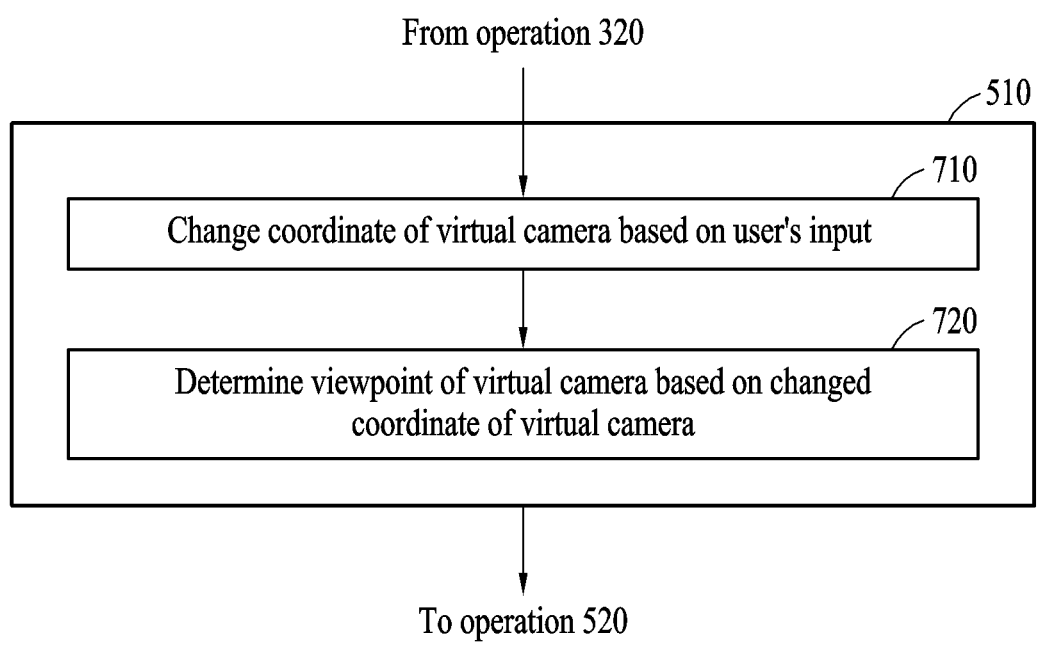
FIG. 7 is a flowchart illustrating a method of determining a viewpoint of a virtual camera based on a user's input according to an example embodiment.

FIG. 7 is a flowchart of a method of determining a viewpoint of a virtual camera based on a user's input according to an example embodiment.

According to one embodiment, operation 510 described herein with reference to FIG. 5 may include operations 710 and 720.

In operation 710, the electronic device 200 may change a coordinate of the virtual camera based on a user's input. For example, the user may enter a command for changing a viewpoint or a coordinate of the virtual camera using a user interface of the electronic device 200. The user interface may include a gyro sensor, a keyboard, a mouse, and/or a touch panel, but is not limited thereto.

In operation 720, the electronic device 200 may determine a viewpoint of the virtual camera based on the changed coordinate of the virtual camera.

According to an embodiment, when operation 720 is performed, at least one target basic-image tile among a plurality of basic image tiles may be re-determined based on the changed coordinate or viewpoint of the virtual camera through operations 520 and 530.

According to an example embodiment, an image with a first resolution to be provided to the user may be rendered again as a viewpoint of the virtual camera changes based on the user's input.

Figure 8:
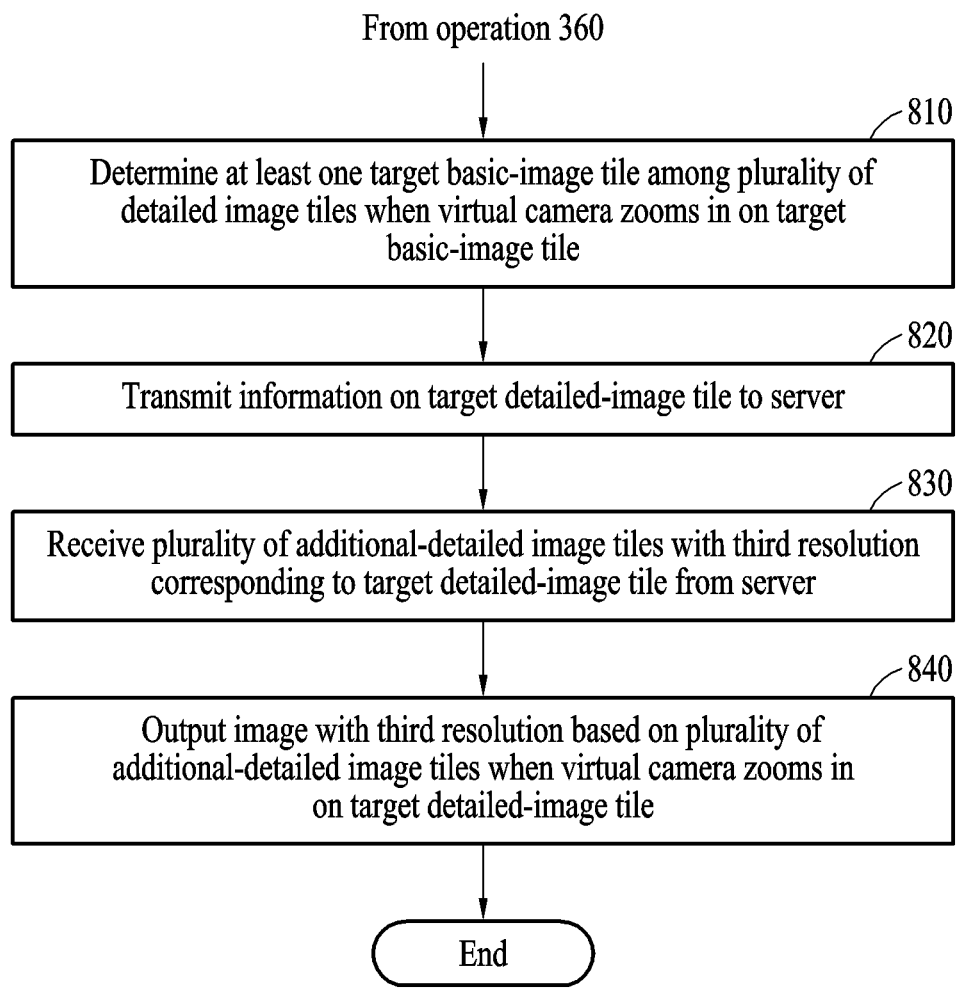
FIG. 8 is a flowchart illustrating a method of outputting an image with a third resolution to a user based on additional-detailed image tiles according to an example embodiment.

FIG. 8 is a flowchart of a method of outputting an image with a third resolution to a user based on additional-detailed image tiles according to an example embodiment.

According to an embodiment, operations 810 through 840 may be further performed following operation 360 described herein with reference to FIG. 3.

According to one embodiment, operations 810 through 830 may be performed independently from and in parallel with operation 370 described herein with reference to FIG. 3. That is, operations 810 through 830 may be performed while an image with the second resolution is being output to the user.

In operation 810, an electronic device 200 may determine at least one target detailed-image tile among a plurality of detailed image tiles corresponding to the target basic-image tile when a virtual camera zooms in on the target basic-image tile. For example, the electronic device 200 may determine, as a target detailed-image tile, a detailed image tile corresponding to a direction at which the user is looking via the virtual camera among the plurality of detailed image tiles on the basis of a coordinate, a viewpoint, and an internal parameter of the virtual camera.

In operation 820, the electronic device 200 may send information about the target detailed-image tile to a server. As an image being output has a second resolution, the user is likely to additionally zoom in to view in detail a scene at which the user is looking (or which is being output). In practice, when the electronic device 200 transmits information on the target detailed-image tile to the server after the user additionally zooms in, a delay may occur until an image with a higher resolution is provided to the user. To prevent such a delay, the electronic device 200 may transmit information on the target detailed-image tile to the server, and receive additional-detailed image tiles with a third resolution corresponding to the target detail image tile before the user additionally zooms in.

In operation 830, the electronic device 200 may receive the plurality of additional-detailed image tiles with the third resolution corresponding to the target detailed-image tile from the server. The third resolution may be higher than the second resolution.

In operation 840, the electronic device 200 may output an image with the third resolution based on the plurality of additional-detailed image tiles previously received from the server when the virtual camera additionally zooms in on the target detailed-image tile.

According to one aspect, the electronic device 200 may render a scene of a graphic space corresponding to an additionally-zoomed-in viewpoint of the virtual camera to generate the image with the third resolution, and output the generated image to the user via a display of the electronic device 200. Since the image with the third resolution is generated and output based on the plurality of pre-received additional-detailed image tiles before the virtual camera further zooms in, the delay in outputting the image felt by the user may be significantly reduced.

Figure 9:
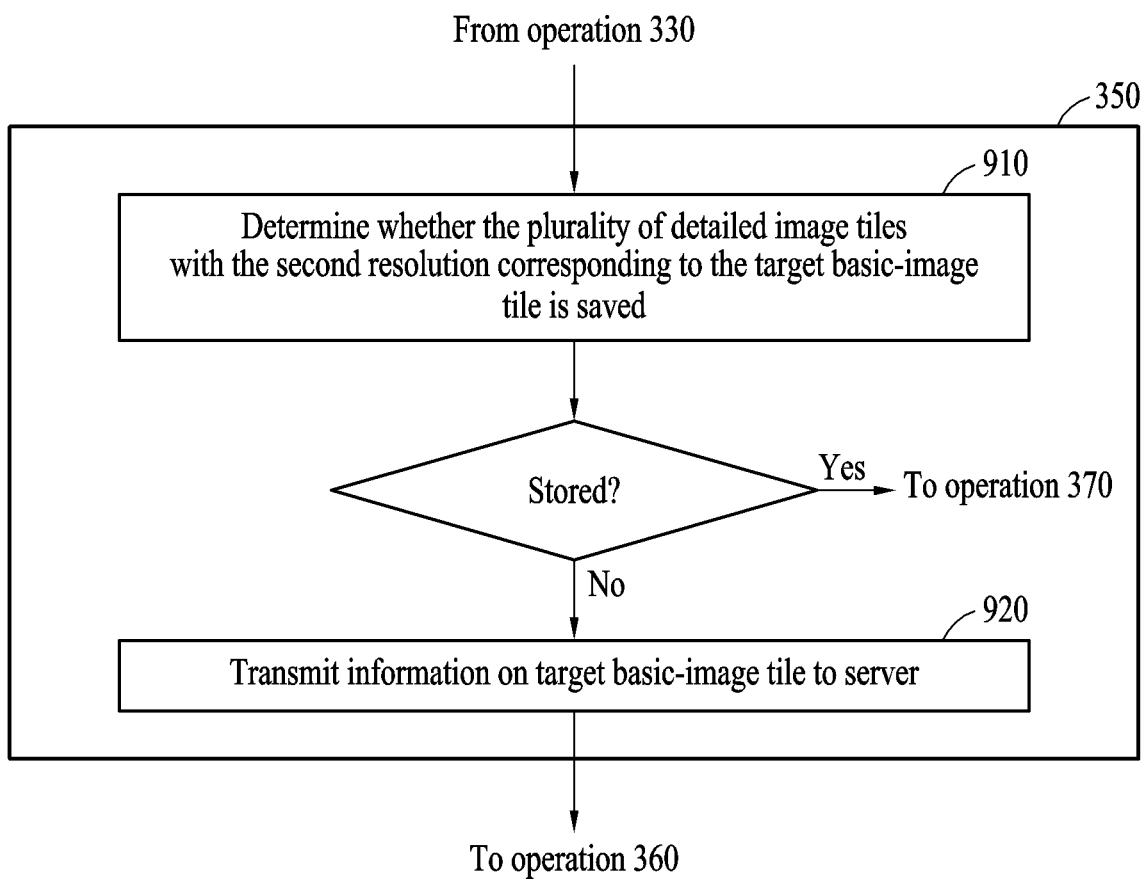
FIG. 9 is a flowchart illustrating a method of transmitting information on a target basic-image tile according to an example embodiment.

FIG. 9 is a flowchart of a method of transmitting information on a target basic-image tile according to an example.

According to one embodiment, operation 350 described herein with reference to FIG. 3 may include following operations 910 and 920.

In operation 910, an electronic device 200 may determine whether a plurality of detailed image tiles with a second resolution corresponding to a target basic-image tile is stored. For example, the plurality of detailed image tiles with the second resolution corresponding to the target basic-image tile previously received from a server may be stored in the electronic device 200 as a user looks at the prior target basic-image tile via a virtual camera.

In operation 920, the electronic device 200 may send information about the target basic-image tile to the sever when the plurality of detailed image tiles with the second resolution corresponding to the target basic-image tile is not stored in the electronic device 200.

When the plurality of detailed image tiles with the second resolution corresponding to the target basic-image tile remain stored in the electronic device 200, operation 370 may be performed immediately because there is no need to receive the plurality of detailed image tiles again from the server.

The device described herein may be embodied in hardware components, software components, and/or a combination thereof. For example, the device and components described in the example embodiments may be embodied using one or more general-purpose or special-purpose computers, such as, for example, a processor, a controller, an Arithmetic Logic Unit (ALU), a digital signal processor, a microcomputer, a Field Programmable Array (FPA), a Programmable Logic Unit (PLU), a microprocessor, or any other device that may perform and respond to instructions. A processing device may perform in an operating system (OS) and one or more software applications performed in the operating system. Further, the processing device may access, store, manipulate, process, and generate data in response to the performance of software. For ease of understanding, there are some cases describing that a single processing device is used but those with ordinary skill in the art appreciate that the processing device may include a plurality of processing elements and/or a plurality of types of processing elements. For example, the processing device may include a plurality of processors, or one processor and one controller. Other processing configurations, such as a parallel processor, are also available.

Software may include a computer program, a code, an instruction, or a combination of one or more thereof, configure an processing device or independently or collectively command the processing device to operate as desired. In order to be interpreted by the processing device, and to provide the processing device with a command or data, the software and/or data may be permanently or temporarily embodied in any type of machines, components, physical devices, virtual equipment, computer storage medium or devices, or transmitted signal waves. The software may be distributed over a computer system coupled to a network, to be stored or performed in a distributed fashion. The software and data may be stored in one or more non-transitory computer-readable media.

A method according to an embodiment may be embodied in a program command form that may be performed through various computer means and recorded on a computer-readable medium. The computer-readable medium may include, alone or in combination with program instructions, data files, data structures, and the like. The program instructions recorded on the medium may be specially designed and configured for example embodiments, or may be well known to those skilled in the art of computer software. Examples of the non-transitory computer-readable media may include, but are not limited to, magnetic media such as hard disks, floppy disks and magnetic tapes, optical media such as CD ROMs and DVDs, magneto-optical media such as floptical disks, and hardware devices specially configured to store and perform program instructions such as ROM, RAM, flash memory, and the like. Examples of the program instructions include machine code such as those created by a compiler, and high-level language codes that may be performed by a computer using an interpreter or the like. The hardware device described herein may be configured to operate as one or more software modules to perform the operation of the embodiments herein, and vice versa.

Although the embodiments of the present disclosure are described with reference to the exemplary embodiments, those of ordinary skill in the art may make various modifications and variations therein without departing from the spirit and scope of the present disclosure. For example, any suitable result may be achieved even if the described technology is performed in a different order from the one described herein, and/or described components, such as systems, structures, devices, circuits, etc., are combined or compounded in a form different from the one described herein, or replaced or substituted with those other than the components described herein or equivalent hereto.

Accordingly, other implementations, embodiments, and those equivalent to the scope of the claims herein belong to the scope of the claims herein.

The components described in the example embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

What is claimed is:

1. An image output method performed by an electronic device, the image output method comprising:
   loading a plurality of basic image tiles with a first resolution, the plurality of basic image tiles with the first resolution being preset for a graphic space set based on a virtual coordinate system;
   setting a coordinate of a virtual camera on the virtual coordinate system;
   determining at least one target basic-image tile among the plurality of basic image tiles based on the coordinate of the virtual camera;
   outputting a first image with the first resolution based on frustum information of the virtual camera and the target basic-image tile;
   transmitting information on the target basic-image tile to a server;
   before the virtual camera zooms in on the target basic-image tile, receiving a plurality of detailed image tiles with a second resolution corresponding to the target basic-image tile from the server, wherein the second resolution is higher than the first resolution;
   outputting a second image with the second resolution based on the plurality of detailed image tiles when the virtual camera zooms in on the target basic-image tile;
   determining at least one target detailed-image tile among the plurality of detailed image tiles corresponding to the target basic-image tile when the virtual camera zooms in on the target basic-image tile,
   transmitting information about the target detailed-image tile to the server,
   wherein after outputting a second image with the second resolution based on the plurality of detailed image tiles, continuously outputting a further second image with the second resolution based on the plurality of detailed image tiles when coordinate or viewpoint of the virtual camera changed;
   before the virtual camera additionally zooms in on the target basic-image tile. receiving a plurality of additional-detailed image tiles with a third resolution corresponding to the target detailed-image tile from the server, wherein the third resolution is higher than the second resolution; and
   outputting a third image with the third resolution based on the plurality of additional-detailed image tiles previously received from the server when the virtual camera additionally zooms in on the target detailed-image tile.

2. The image output method of claim 1, wherein the determining of the at least one target basic-image tile among the plurality of basic image tiles based on the coordinate of the virtual camera comprises:
   determining a viewpoint of the virtual camera based on the coordinate of the virtual camera;
   calculating the frustum information on the viewpoint of the virtual camera; and
   determining at least one target basic-image tile among the plurality of basic image tiles based on the frustum information.

3. The image output method of claim 2, wherein the determining of the viewpoint of the virtual camera based on the coordinate of the virtual camera comprises:
   changing the coordinate of the virtual camera based on a user's input to the electronic device; and
   determining a viewpoint of the virtual camera based on the changed coordinate of the virtual camera.

4. The image output method of claim 1, wherein the determining of the at least one target basic-image tile among the plurality of basic image tiles based on the coordinate of the virtual camera comprises
   re-determining at least one target basic-image tile among the plurality of basic image tiles based on the changed coordinate of the virtual camera or the viewpoint of the virtual camera when the coordinate of the virtual camera or the viewpoint of the virtual camera is changed.

5. The image output method of claim 1, wherein the transmitting of the information on the target basic-image tile to a server comprises:
   determining whether the plurality of detailed image tiles with the second resolution corresponding to the target basic-image tile is stored; and
   transmitting information on the target basic-image tile to the server when the plurality of detailed image tiles with the second resolution is not stored.

6. A non-transitory computer-readable medium comprising computer readable instructions to cause a computer to perform the method of claim 1.

7. An electronic device for performing an image output method, the electronic device comprising:
   a memory in which a program for outputting an image is recorded; and
   a processor configured to perform the program
   wherein the program is configured to perform:
   loading a plurality of basic image tiles with a first resolution being preset for a graphic space set based on a virtual coordinate system;
   setting a coordinate of a virtual camera on the virtual coordinate system;
   determining at least one target basic-image tile among the plurality of basic image tiles based on the coordinate of the virtual camera;
   outputting a first image with the first resolution based on frustum information of the virtual camera and the target basic-image tile;
   transmitting information on the target basic-image tile to a server;
   before the virtual camera zooms in on the target basic-image tile, receiving a plurality of detailed image tiles with a second resolution corresponding to the target basic-image tile from the server, wherein the second resolution is higher than the first resolution; outputting a second image with the second resolution based on the plurality of detailed image tiles when the virtual camera zooms in on the target basic-image tile;

determining at least one target detailed-image tile among the plurality of detailed image tiles corresponding to the target basic-image tile when the virtual camera zooms in on the target basic-image tile, transmitting information about the target detailed-image tile to the server, wherein after outputting a second image with the second resolution based on the plurality of detailed image tiles, continuously outputting a further second image with the second resolution based on the plurality of detailed image tiles when coordinate or viewpoint of the virtual camera changed;

before the virtual camera additionally zooms in on the target basic-image tile, receiving a plurality of additional-detailed image tiles with a third resolution corresponding to the target detailed-image tile from the server, wherein the third resolution is higher than the second resolution; and outputting a third image with the third resolution based on the plurality of additional-detailed image tiles previously received from the server when the virtual camera additionally zooms in on the target detailed-image tile.

8. An image output method performed by a system for outputting an image to a user, the image output method comprising:

loading, by a user's terminal of the system, a plurality of basic image tiles with a first resolution, the plurality of basic image tiles being preset for a graphic space set based on a virtual coordinate system;

setting, by the user's terminal, a coordinate of a virtual camera on the virtual coordinate system;

determining, by the user's terminal, at least one target basic-image tile among the plurality of basic image tiles based on the coordinate of the virtual camera;

outputting, by the user's terminal, a first image with the first resolution based on frustum information of the virtual camera and the target basic-image tile;

transmitting, by the user's terminal, information on the target basic-image tile to a server of the system;

before the virtual camera zooms in on the target basic-image tile, receiving, by the user's terminal, a plurality of detailed image tiles with a second resolution corresponding to the target basic-image tile from the server, wherein the second resolution is higher than the first resolution; outputting, by the user's terminal, a second image with the second resolution based on the plurality of detailed image tiles when the virtual camera zooms in on the target basic-image tile;

determining, by the user's terminal, at least one target detailed-image tile among the plurality of detailed image tiles corresponding to the target basic-image tile when the virtual camera zooms in on the target basic-image tile, transmitting, by the user's terminal, information about the target detailed-image tile to the server, wherein after outputting a second image with the second resolution based on the plurality of detailed image tiles, continuously outputting, by the user's terminal, a further second image with the second resolution based on the plurality of detailed image tiles when coordinate or viewpoint of the virtual camera changed;

before the virtual camera additionally zooms in on the target basic-image tile, receiving, by the user's terminal, a plurality of additional-detailed image tiles with a third resolution corresponding to the target detailed-image tile from the server, wherein the third resolution is higher than the second resolution; and outputting, by the user's terminal, a third image with the third resolution based on the plurality of additional-detailed image tiles previously received from the server when the virtual camera additionally zooms in on the target detailed-image tile.

\* \* \* \* \*